United States Patent Office 3,443,512
Patented May 13, 1969

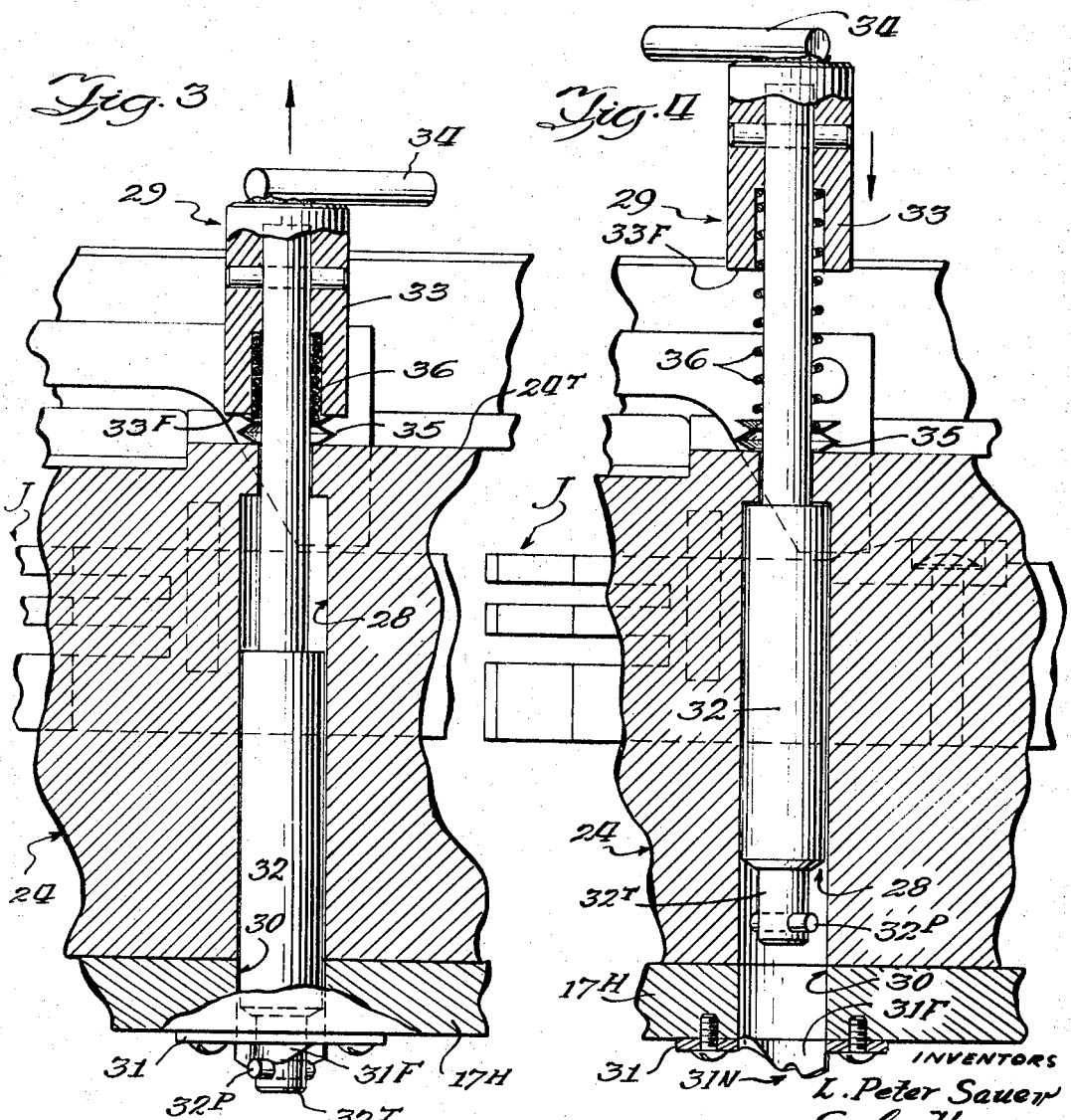

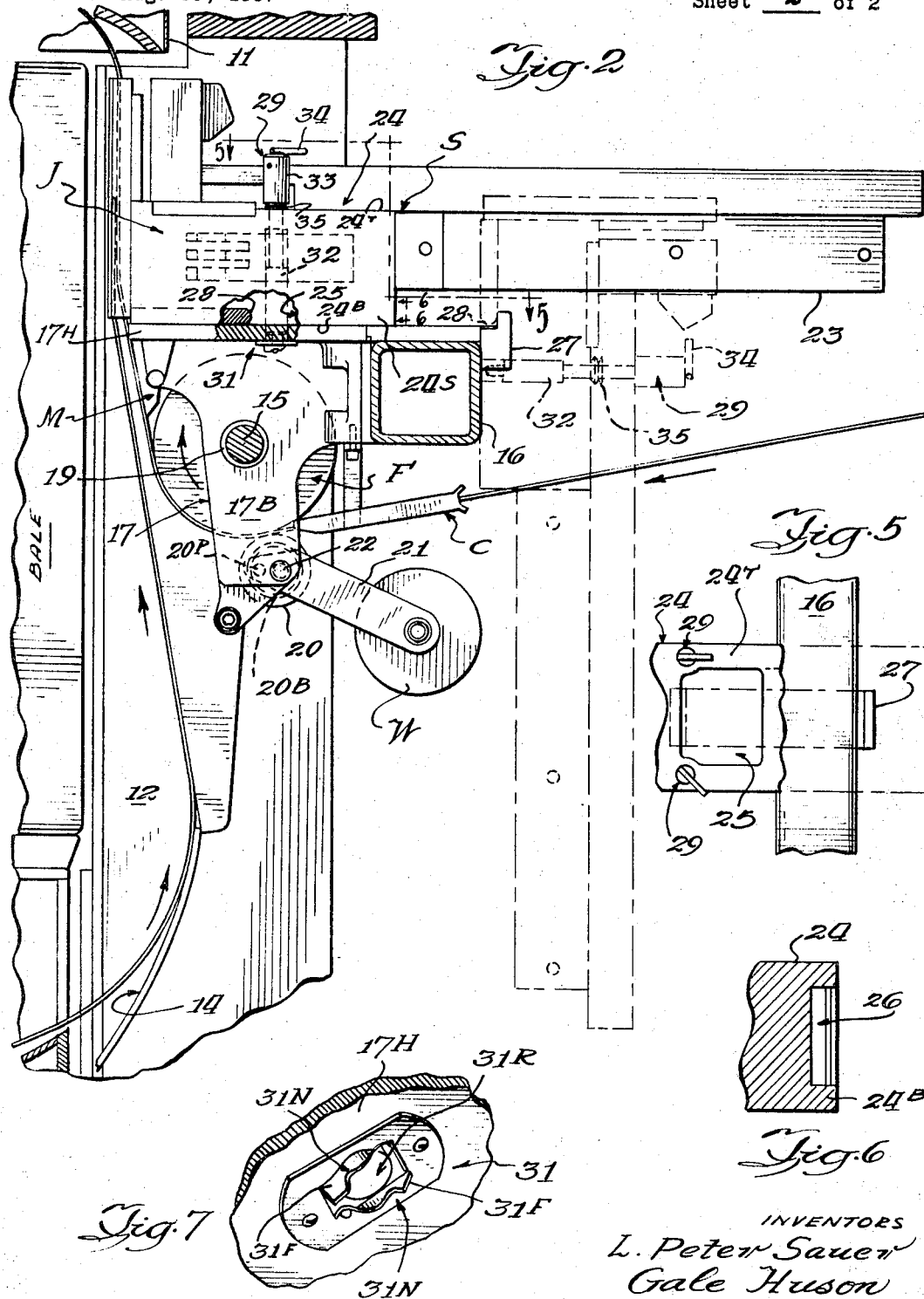

3,443,512
ARTICULATED STRAPPING APPARATUS
Leo Peter Sauer and Gale Huson, Glenview, Ill., assignors to Signode Corporation, a corporation of Delaware
Filed Aug. 30, 1967, Ser. No. 664,338
Int. Cl. B65b 13/04
U.S. Cl. 100—26                              7 Claims

ABSTRACT OF THE DISCLOSURE

Articulated strap sealer and feeder units are shown in multiple mounting arrays used in conjunction with the baling box of a baling press. The feeder units are powered from a common drive shaft, each feeder unit having urethane faced feed and back up wheels for a friction feed system. The back up wheel is loaded towards the feed wheel by an eccentric lever mounting arrangement. Each sealer unit is mounted separately and is locked in operating position by a pair of quick disconnect type bayonet locks that are carried in the sealer housing. An open type housing structure presents an accessible pivot ledge that is engageable upon a fixed hook to store the sealer in an inoperative vertical hanging position. The housing has a notched bottom wall allowing it to slide over the hook until the pivot ledge is engaged.

Background of the invention

In multiple strapping arrays such as are used with the baling box of a cotton bale press, the strapping apparatus is fixedly mounted along the rear wall of the baling box and where entanglement or bunching of the strap occurs at the sealer, it is difficult to gain access to the trouble region for clearing the strap. In a typical multiple array of this type, the feeder units are ganged on a common drive and each feeder unit is integrated with a corresponding sealer unit so that disassembly becomes a major maintenance operation.

High traction in the feed system which also pulls slack after the loop is formed is not indispensable because the bale is highly compacted by the press and tends to expand so that a tight package results even where initial loop tension may be relatively low. With toothed feed wheel systems, the strap is fed under relatively high traction conditions which creates an increased tendency for the strap to jam and this should be avoided.

Summary of the invention

The present invention relates to an articulated strapping apparatus whereby the sealer can be moved relative to the feeding unit. This arrangement permits access to the sealer unit in the event the need for such access arises due to jamming or other malfunction. The sealing unit is connected to the feeder by a quick disconnect locking arrangement.

Other features and advantages of the invention will be apparent from the following description and claims, and are illustrated in the accompanying drawings which show structure embodying preferred features of the present invention and the principles thereof, and what is now considered to be the best mode in which to apply these principles.

Brief description of the drawings

In the accompanying drawings forming a part of the specification, and in which like numerals are employed to designate like parts throughout the same, FIG. 1 is a fragmentary elevational view of a baling box of a cotton baling press to illustrate a typical mounting environment in which the invention is to be used;

FIG. 2 is an enlarged transverse section taken on the back wall of the baling box as indicated on the line 2—2 of FIG. 1 to show the mounting of one of the five power strapping machines which are mounted along the back wall of the press;

FIG. 3 is an enlarged fragmentary sectional view illustrating a bayonet lock in anchored position;

FIG. 4 is a related view to FIG. 3 and showing the lock in release position;

FIG. 5 is a diagrammatic plan outline view taken approximately on the line indicated at 5—5 of FIG. 2;

FIG. 6 is a fragmentary transverse section taken on the line 6—6 of FIG. 2; and

FIG. 7 is a fragmentary perspective view showing a keeper which is used with the bayonet lock.

Description of preferred embodiment

Referring now to the drawings, the general wall arrangement of a baling box portion of a cotton baling press is illustrated in FIG. 1 to represent a multiple unit strapping installation incorporating an array of strap sealer and feeder units. The baling box is designated generally at 10 and includes a top platen 11 (see FIG. 2), a rear wall 12 which carries an external array comprised of five side by side mounted power strapping assemblies and end walls 13 which flank the rear wall but are shown in retracted position. As illustrated, the baling box may be understood to be open so that the front wall does not appear. The rear wall is provided with a separate strap guide chute 14 for each strapping assembly to direct a length of strap during its travel into and around the baling box. One of the power strapping machines associated with the rear wall 12 is shown in elevation in FIG. 2 and is designated generally at M. Each strapping machine includes a sealer unit S and a feeder unit F. A strap loop L is shown after it has been fed from a supply (not shown) through an entry chute C and through a feeder unit F to enter the guide chute 14 in the rear wall at a point beneath the sealer unit, the strap following a travel path which leads through the sealer unit, then upwardly into the platen 11 to cross the top of the baling space, then down the front wall (not shown) of the box, then across the bottom and back into the guide chute 14 of the rear wall 12 to return to the sealer unit and present overlapping strap ends for sealing in any conventional fashion.

This general arrangement as described thus far is like that shown in a pending application filed in the name of Merkel et al. Ser. No. 642,770, filed June 1, 1967, and entitled Method and Apparatus for Tying a Compressed Bale, the disclosure of said application, to the extent that it is not inconsistent herewith, being specifically incorporated herein by this reference.

Most problems occuring during a strapping operation occur at the sealer jaws so that access to the face of the sealer unit is important. One problem with an integrated arrangement of sealer and feeder units is that only partial access to the face of the sealer unit can be had through the center of the baling box and this is most difficult and inconvenient. Therefore, misfeed of a strap or entanglement of the strap at the sealer unit is difficult to clear.

The main frame of the machine includes a mounting bar 16 that carries a series of mounting brackets 17, each including a head plate 17H and a depending bracket portion 17B. The brackets 17 mount the common drive shaft 15 which carries individual feed wheels 19 alongside each bracket portion 17B. A separate back up wheel 20 is associated with each feed wheel 19, each back up wheel being mounted on a bushing 20B carried eccentrically by a roll pin 20P at the end of a lever 21 which is pivoted on a shaft 22 mounted in the bracket 17B. The other end of the lever 21 is provided with a weight W normally acting to swing the lever in a direction to load the back up wheel against the feed wheel 19.

In the arrangement illustrated herein, the strap feed system uses a friction type drive to avoid marking of the strap, as is typical with toothed wheels. Accordingly, each drive wheel 19 is a six-inch diameter wheel having a urethane facing and each back up wheel 20 is a 2½ inch diameter wheel having a urethane facing. There is less tendency for these wheel surfaces to clog or pack with debris. In addition, the urethane faced wheels provide a uniform tractive force in the feed direction which is less than that normally developed by toothed wheels thereby reducing the possibility of severe jamming at the sealer head or in the guide chutes of the baling box in the event of a misfeed. Urethane faced friction wheels are also lower in manufacturing costs.

The sealer units S for the power strapping machines, as shown herein, are of the general type shown in the Leslie et al. Patent No. 2,707,429 and include a two stage hydraulic cylinder section 23 for powering a sealer jaw mechanism J of conventional type used for guiding and gripping the free end of the strap and finally forming and notching the seal. These sealer details are shown and described in the aforesaid Leslie et al. patent. Another sealer unit of the general type referred to herein is described in Goland et al. application Ser. No. 653,900 which is assigned to the assignee of the present invention.

In accordance with one aspect of the present invention, the sealer unit S including the hydraulic cylinder section 23 is made easily separable from the feeder unit F for servicing. The sealer unit includes a main housing 24 for the sealer jaw assembly, this housing being shown resting upon the head plate 17H of the feeder mounting frame structure. The rear portion of the housing 24 is hollow to provide clearance for sealer jaw operating mechanism (not shown) which is powered by the hydraulic cylinder section 23. The rear portion of the housing has unbroken side walls 24S as is apparent in FIG. 2 and has top and bottom walls, 24T and 24B, respectively, each provided with window-like openings 25 (see FIG. 5). The bottom wall 24B has a central notch 26 (see FIG. 6) to provide mounting clearance for a support hook 27 which is provided on the feeder mounting bar 16, there being one hook provided for each sealer unit. A plate portion 28 of the bottom wall 24B of the sealer housing borders the forward extremity of the window 25 to present a central ledge for engagement on the corresponding hook 27.

The windows which are provided in the top and bottom walls are flanked by vertical bores 28 provided in the sealer housing to mount a pair of lock units 29 that serve to secure each sealer housing to the corresponding head plate 17H. The feeder head plates 17H have extension bores 30 in registry with each housing bore 28 and each carries a separate keeper plate 31 secured on the underface of the head plate and partly intersecting the bore 30 to cooperate with the lock unit 29.

Each lock unit 29 is of a quick disconnect bayonet type and includes a stepped diameter shaft 32 having a lower terminal end 32T of reduced diameter and equipped with a radial lock pin 32P that cooperates with the keeper plate 31. The shaft 32 has a reduced upper end fitted with a cup-shaped housing 33 that is equipped with a rod-like top handle 34. A set of "Belleville" spring washers 35 encircle the upper end of the shaft and seat on the top wall 24T of the sealer housing and a coil lift spring 36 acts in tandem with the washers 35 and seats within the cup-shaped housing 33 normally tending to hold the cup-shaped housing in the elevated position when the lock is disengaged. Each keeper 31 includes depending cam flanges 31F having intermediate notches 31N to receive opposite ends of the lock pin 32P in the locked position of the parts.

To fix the sealer housing 24 in place upon the head plate 17H, the lock shafts are depressed to enter the lock pin longwise through the rectangular opening 31R in the keeper plate 31. At this point, the lift spring 36 has been compressed and the end face 33F of the spring housing 33 abuts the top spring washer 35. The lock shaft 32 is then rotated to cause the lock pin 32P to ride along the cam surfaces 31F and seat in the cam notches 31N. The spring housing 33 is drawn downwardly by this final rotating action to compress the spring washers 35 and the sealer housing is now securely locked in place.

Should it become necessary to clear the sealer jaws of a strap buckling condition or if necessary for servicing, any one or more of the sealer units S may be shifted from the operation position, shown in full lines in FIG. 2, to a vertical hanging position, shown in phantom lines in FIG. 2. In this vertical hanging position, the hook 27 provided on the mounting bar projects through the open bottom window 25 of the sealer housing and engages the pivot ledge 28 at the front end of the window. With the disclosed arrangement, it is convenient to shift any sealer unit to the vertical hanging position simply by disengaging the locks 29 at each side of the unit and then sliding the unit rearwardly along the header plate 17P. The bottom notch 26 along the rear end of the housing is higher and wider than the hook 27 so that the sealer unit can be pulled horizontally rearwardly until ledge 28 catches against the hook 27. At this point the sealer housing will tend to pivot from its horizontal position towards its vertical hanging position. In this vertical position, the sealer jaws are readily accessible through the front end of the sealer unit which now faces upwardly. The strap chute region associated with the withdrawn sealer is also readily accessible.

Thus, while preferred constructional features of the invention are embodied in the structure illustrated herein, it is to be understood that changes and variations may be made by those skilled in the art without departing from the spirit and scope of the appended claims.

What is claimed is:

1. In strapping apparatus that includes a strap guide wall, a support frame adjacent said wall, strap feeder mechanism mounted on said frame and operable to feed strap through said wall to form a strap loop having overlapping strap ends along said wall and strap sealer mechanism supported immediately above said strap feeder mechanism to secure said overlapping strap ends, the improvement comprising a feeder head plate slidably supporting said sealer mechanism upon said feeder mechanism, a hook disposed on said support frame in rearward alignment with said sealer mechanism, said sealer mechanism having a rear housing portion provided with a rearwardly facing pivot ledge and having slide clearance along a bottom housing region to permit said housing to be withdrawn along said head plate until said pivot ledge engages said hook to determine a vertical hanging position for said sealer mechanism, and quick-release locking means interengageable between said feeder and sealer mechanisms to lock said sealer mechanism in supported position on said feeder mechanism and to free said sealer mechanism for sliding movement to the vertical hanging position.

2. In strapping apparatus in accordance with claim 1 and wherein said sealer housing has a pair of said locking means extending therethrough in flanking relation to said pivot ledge, and said head plate has a separate keeper for engagement by said locking means.

3. In strapping apparatus in accordance with claim 2 wherein each locking means includes a stepped diameter lock shaft having reduced upper and lower ends, a spring washer encircling said upper end and seats on said sealer housing, an inverted cup-shaped housing fixed to and riding on said upper end, a lift spring encircling said upper end and reacting between said spring washer and an interior region of said cup-shaped housing, and a lock pin riding in said lower end and engageable with the corresponding keeper upon first depressing and then rotating the lock shaft.

4. In strapping apparatus in accordance with claim 3 and wherein each of said keepers has a pair of depending cam flanges provided with an intermediate notch to receive one end of the lock pin and hold the lock shaft depressed to a point where the cup-shaped housing engages and compresses the corresponding spring washer.

5. In strapping apparatus in accordance with claim 1 and wherein said feeder mechanism includes a power-driven traction wheel, and a back up wheel floatingly mounted adjacent said traction wheel and normally biased thereagainst to grip strap therebetween.

6. In strapping apparatus in accordance with claim 5 and wherein a lever pivotally engages said feeder mechanism and includes an end connection floatingly carrying said back up wheel at a connection point eccentrically related to the center of rotation of the back up wheel and offset therefrom towards the direction of strap supply and an opposite end connection carrying a weight that loads the wheels against the strap.

7. In strapping apparatus in accordance with claim 5 and wherein said traction and back up wheels have cooperating urethane faces thereon.

References Cited

UNITED STATES PATENTS

| | | | |
|---|---|---|---|
| 3,125,018 | 3/1964 | Brouse et al. | 100—26 |
| 3,213,780 | 10/1965 | Neitzel et al. | 100—26 XR |
| 3,220,337 | 11/1965 | Goland et al. | 100—26 XR |

BILLY J. WILHITE, *Primary Examiner.*

U.S. Cl. X.R.

100—215, 222, 256, 269; 198—19; 227—152